United States Patent [19]

Swanson

[11] 4,055,502
[45] Oct. 25, 1977

[54] METHOD AND COMPOSITION FOR ACIDIZING SUBTERRANEAN FORMATIONS

[75] Inventor: Billy L. Swanson, Bartlesville, Okla.

[73] Assignee: Phillips Petroleum Company, Bartlesville, Okla.

[21] Appl. No.: 643,984

[22] Filed: Dec. 24, 1975

[51] Int. Cl.² ............................................. E21B 43/27
[52] U.S. Cl. ............................... 252/8.55 C; 166/282; 166/307; 252/8.55 R; 252/316
[58] Field of Search ................... 252/8.55 R, 8.55 C, 252/316; 166/282, 307; 149/44

[56] References Cited

U.S. PATENT DOCUMENTS

| 3,216,962 | 11/1965 | Gatza | 260/29.6 |
|---|---|---|---|
| 3,252,904 | 5/1966 | Carpenter | 252/8.55 |
| 3,301,323 | 1/1967 | Parsons | 175/64 X |
| 3,679,000 | 7/1972 | Kaufman | 252/8.55 X |
| 3,727,689 | 4/1973 | Clampitt | 166/307 X |
| 3,768,565 | 10/1973 | Persinski et al. | 166/308 |
| 3,868,328 | 2/1975 | Boothe et al. | 252/8.55 |

Primary Examiner—Herbert B. Guynn

[57] ABSTRACT

Gelled acidic compositions suitable for either matrix acidizing or fracture-acidizing of subterranean formations, and methods of using said compositions in acidizing operations, are provided. Said compositions comprise water, a water-dispersible polymer of acrylamide, an acid, and a flavotannin gelling agent. In a preferred embodiment, said compositions also comprise a gelation promoter, e.g., sodium dichromate or potassium dichromate.

39 Claims, No Drawings

METHOD AND COMPOSITION FOR ACIDIZING SUBTERRANEAN FORMATIONS

This invention relates to acid treating or acidizing of subterranean formations.

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid into the well under sufficient pressure to force the acid out into the formation where it reacts with the acid-soluble components of the formation. The technique is not limited to formations of high acid solubility such as limestone, dolomite, etc. The technique is also applicable to other types of formations such as a sandstone containing streaks or striations of acid soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix acidizing.

Hydraulic fracturing is also commonly employed to increase the production of fluids from subterranean formation. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

Poor penetration can also be caused, and/or aggravated, by fluid loss to the more porous zones of the formation where low permeability is not a problem. Poor penetration can also be caused, and/or aggravated, by leakoff at the fracture faces in combination fracturing-acidizing operations. Either said fluid loss or said leak-off can frequently worsen the situation by leaving the tight (low permeability) zones of the formation unchanged and merely opening up the already high permeability zones.

One solution which has been proposed for the above discussed problem is to incorporate various polymeric thickening or viscosifying agents into the acid solution. Said agents serve to thicken the acid solution and thus increase the viscosity thereof. It has been reported that so thickened acid solutions have reduced fluid loss properties. For example, see U.S. Pat. No. 3,415,319 issued in the name of B. L. Gibson; and U.S. Pat. No. 3,434,971 issued in the name of B. L. Atkins. It has also been reported that the reaction rate of said so-thickened acid solutions with the acid-soluble portions of the formation is lessened or retarded. See, for example, U.S. Pat. No. 3,749,169 issued in the name of J. F. Tate; U.S. Pat. No. 3,236,305 issued in the name of C. F. Parks; and U.S. Pat. No. 3,252,904 issued in the name of N. F. Carpenter.

Higher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc. For example, acidizing of a tight low permeability formation will proceed more slowly than a more permeable formation, other factors being the same, because a longer time will be required to obtain a significant amount of etching and the composition must remain in place and effective for a longer period of time. Also, more time will be required to pump the acidic composition into place in the formation.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decrease in viscosity. Another such effect is increased rate or reaction of the acid with the formation. Thus, some compositions which would be satisfactory in a low temperature formation such as in the Hugoton field in the Anadarko resin might not be satisfactory in formations encountered in deeper wells as in some West Texas fields.

In ordinary acidizing operations using unthickened acids there is usually no problem in removing the spent acid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation, or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above discussed problems. The present invention provides improved methods for acidizing, or fracture-acidizing, subterranean formations; and new gelled acidic compositions for use in said methods.

Thus, in accordance with one broad aspect of the concept of the invention, there is provided a method for acid treating a porous subterranean formation susceptible of attack by an acid and penetrated by a well bore, which method comprises: injecting into said formation via said well bore a gelled acidic composition comprising water; an amount of a water-dispersible polymer of acrylamide which is sufficient to thicken said water; an amount of a water-dispersible flavotannin gelling agent which is sufficient to cause gelation of an aqueous dispersion of the components of said composition; an amount of a non-oxidizing acid which is capable of reacting with a significant amount of the acid-soluble components of said formation; said polymer, said flavotannin gelling agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation; and maintaining said composition in said formation in contact therewith for a period of time sufficient for the acid in said composition to significantly react with the acid-soluble components of said formation and stimulate the production of fluids therefrom.

In preferred embodiments of the invention, said compositions also comprise a gelation promoter, e.g., sodium dichromate or potassium dichromate, as discussed further hereinafter.

Thus, in accordance with another aspect of the concept of the invention there is provided a gelled acidic composition, suitable for matrix acidizing or fracture-acidizing of a porous subterranean formation susceptible of attack by an acid, comprising: water; a water-thickening amount of a water-dispersible polymer selected from the group consisting of polyacrylamides and polymethacrylamides wherein up to about 25 percent of the carboxamide groups can be initially hydrolyzed to carboxyl groups; crosslinked polyacrylamides and crosslinked polymethacrylamides wherein up to about 25 percent of the carboxamide groups can be initially hydrolyzed to carboxyl groups; copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and mixtures thereof; an amount of an acid which is capable of reacting with a significant amount of the acid-soluble components of said formation; a small but effective amount of a water-dispersible flavotannin gelling agent which is sufficient to cause gelation of an aqueous dispersion of the components of said composition; and a small but effective amount of a gelation promoter which is sufficient to promote said gelation, said gelation promoter being selected from the group consisting of ammonium chromate, ammonium dichromate, the alkali metal chromates, the alkali metal dichromates, chromium trioxide, sodium permanganate, potassium permanganate, and mixtures thereof; said polymer, said gelling agent, said gelation promoter, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to react significantly with the acid-soluble components of said formation and stimulate the production of fluids therefrom.

As noted above, the gelled acidic compositions of the invention must be suitable for matrix acidizing or fracture-acidizing of subterranean formations. In order to satisfy this requirement, the polymer, the flavotannin gelling agent, the gelation promoter (when used), and the acid, in the amounts used, must be sufficiently compatible with each other, in an aqueous dispersion thereof, to permit the gelation of said dispersion and thus form a said composition having sufficient stability to degeneration by the heat of the formation to permit good penetration of said composition into the formation. Furthermore, once said penetration has been attained, the said stability must be sufficient to permit the maintaining of said composition in contact with the formation for a period of time sufficient for the acid in the composition to significantly react with the acid-soluble components of the formation and stimulate the production of fluids therefrom, e.g., by creating new passageways or enlarging existing passageways through said formation.

Herein and in the claims, unless otherwise specified, the term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to 5 or more, in a small volume matrix acidizing operation, and several hundred feet, e.g., up to 500 or more, in a large volume fracture-acidizing operation.

Herein and in the claims, unless otherwise specified, the term "polymer" is employed generically to include both homopolymers and copolymers; and the term "water-dispersible" is employed generically to include those polymers, and those flavotannins, which are truly water-soluble and those polymers, and those flavotannins, which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Any suitable polymer of acrylamide meeting the above stated compatibility requirements can be used in the practice of the invention. Thus, under proper conditions of use, such polymers can include various polyacrylamides and related polymers which are water-dispersible and which can be used in an aqueous medium, with the gelling agents described herein, to give an aqueous gel. These can include the various substantially linear homopolymers and copolymers of acrylamide and methacrylamide. By substantially linear it is meant that the polymers are substantially free of crosslinking between the polymer chains. Said polymers can have up to about 25 percent of the carboxamide groups hydrolyzed to carboxyl groups. One presently preferred group of polymers includes those wherein up to about 10 percent of the carboxamide groups are hydrolyzed. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

As used herein and in the claims, unless otherwise specified, the stated values for "degree of hydrolysis" or "percent hydrolyzed," and like terms, refer to initial values prior to use or test of the polymer. Unless otherwise stated, said values were obtained by the following analytical procedure. Place 200 ml of distilled water in a beaker provided with a magnetic stirrer. Weigh a 0.1 gram polymer sample accurately to ± 0.1 mg. Start the stirrer and quantitatively transfer the weighed sample into the water vortex. Stir at a rapid rate overnight. Using a pH meter and 1:1 HCl, adjust the pH of the sample solution to less than 3.0. Stir the solution for 30 minutes. Adjust the pH of the solution to exactly 3.3 by dropwise addition of 0.1 N NaOH. Then slowly titrate with standard 0.1 N NaOH from pH 3.3 to pH 7.0.

$$\% \text{ Hydrolysis} = \frac{V \times N \times 0.072 \times 100}{W}$$

where: V = ml of base used in titration; N = normality of base; W = grams of polymer sample; and 0.072 = milliequivalent weight of acrylic acid.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80° C. The resulting polymer is recovered from the aqueous medium, as by drum drying, and can be subsequently ground to the desired particle size. The particle size should be fine enough to facilitate dispersion of the polymer in water. A presently preferred particle size is such that about 90 weight percent will pass through a number 10 mesh sieve, and not more than about 10 weight percent will be retained on a 200 mesh sieve (U.S. Bureau of Standards Sieve Series).

Under proper conditions of use, examples of copolymers which can be used in the practice of the invention can include the water-dispersible copolymers resulting from the polymerization of a major proportion of acrylamide or methacrylamide and a minor proportion of an ethylenically unsaturated monomer copolymerizable therewith. It is desirable that sufficient acrylamide or methacrylamide be present in the monomers mixture to impart to the copolymer the above-described water-dispersible properties. Such other monomers include acrylic acid, methacrylaic acid, vinylsulfonic acid, vinylbenzylsulfonic acid, vinylbenzenesulfonic acid, vinyl acetate, acrylonitrile, methylacrylonitrile, vinyl alkyl ether, vinyl chloride, maleic anhydride, vinyl substituted cationic quaternary ammonium compounds, and the like. Various methods are known in the art for preparing said copolymers. For example, see U.S. Pat. Nos. 2,625,529; 2,740,522; 2,729,557; 2,831,841; and 2,909,508. Said copolymers can also be used in the hydrolyzed form, as discussed above for the homopolymers.

One presently preferred group of copolymers for use in the practice of the invention are the copolymers of acrylamide with a monomer of the formula

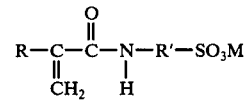

(A)

wherein: R is hydrogen or a lower alkyl radical containing from 1 to 6 carbon atoms, said R preferably being hydrogen or a methyl radical; R' is an alkylene radical containing from 1 to 24 carbon atoms or an arylene radical containing from 6 to 10 carbon atoms, said R' preferably being an alkylene radical containing from 2 to about 10 carbon atoms; and M is hydrogen, ammonium, or an alkali metal, said M preferably being hydrogen, sodium, or potassium; and wherein the number of repeating units from said formula (A) monomer is within the range of from 5 to 75, preferably 10 to 70, mol percent.

Monomers of the above formula (A) and methods for their preparation are known in the art. For example, see U.S. Pat. No. 3,507,707, issued Apr. 14, 1970 in the name of L. E. Miller et al; and U.S. Pat. No. 3,768,565, issued Oct. 30, 1973 in the name of L. J. Persinki. In the above formula (A), when R is hydrogen,

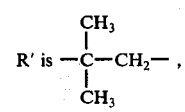

and M is hydrogen, said monomer is the well known AMPS (trademark) monomer, 2-acrylamido-2-methylpropanesulfonic acid, which is available commercially from The Lubrizol Corporation, Cleveland, Ohio. The alkali metal salts of said monomer, e.g., sodium 2-acrylamido-2-methylpropane sulfonate, are also readily available.

Copolymers of acrylamide with said AMPS monomer, and/or its sodium salt, are known. For example, see the above-mentioned Persinski patent. A number of said copolymers are also available commercially from Hercules Incorporated, Wilmington, Delaware. For example, Hercules SPX-5025, a 90:10 acrylamide/AMPS sodium salt copolymer; Hercules SPX-5022, and 80:20 acrylamide/AMPS sodium salt copolymer; Hercules SPX-5023, a 50:50 acrylamide/AMPS sodium salt copolymer; and Hercules SPX-5025, a 70:30 acrylamide/AMPS sodium salt copolymer. The above type of copolymers wherein the number of units from said formula (A) monomer is within the range of from 10 to 70 mol percent, thus comprise one presently preferred group of copolymers for use in the practice of the invention. Said copolymers can be represented by the formula

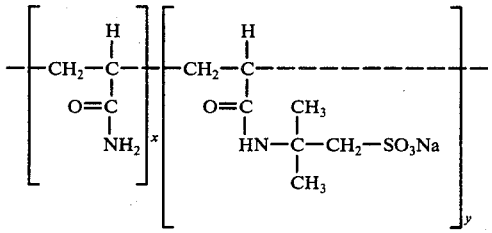
(B)

wherein x and y represent the mol percent of said units as set forth above, it being understood tht the various copolymers do not necessarily consist of alternating units as depicted above in (B). It is also within the scope of the invention for the acrylamide units in the above formula (B) to be methacrylamide units.

Another presently preferred group of copolymers for use in the practice of the invention are the copolymers of acrylamide with a monomer of the formula

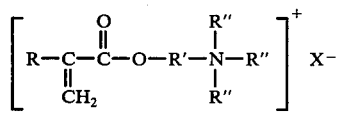
(C)

wherein: R is hydrogen or a lower alkyl radical containing from 1 to 6 carbon atoms, said R preferably being hydrogen or a methyl radical; R' is an alkylene radical containing from 1 to 24 carbon atoms or an arylene radical containing from 6 to 10 carbon atoms, said R' preferably being an alkylene radical containing from 2 to about 10 carbon atoms; each R'' is an alkyl radical containing from 1 to 6 carbon atoms, preferably from 1 to 4 carbon atoms; X is any suitable anion such as methylsulfate, ethylsulfate, chloride, bromide, acetate, nitrate, and the like; and wherein the number of repeating units from said formula (C) monomer is within the range of from 1 to 75, preferably 5 to 70, more preferably 10 to 60, mol percent.

Monomers of the above formula (C) and methods for their preparation are known in the art. For example, see U.S. Pat. No. 3,573,263, issued Mar. 30, 1971 in the name of E. A. Gill. In the above formula (C), when R is H, R' is $-CH_2-CH_2-$, one R'' is a methyl radical and the other two R'' are each an ethyl radical, and X is a $CH_3SO_4^-$ anion, the monomer is the commercially available material (acryloyloxyethyl)diethylmethylammonium methyl sulfate, which can be referred to as DEMMS. In the above formula (C), when R is a methyl radical, R' is $-CH_2-CH_2-$, each R'' is a methyl radical, and X is a $CH_3SO_4^-$ anion, the monomer is the commercially available material (methacryloyloxyethyl)trimethylammonium methyl sulfate, sometimes referred to as MTMMS.

Copolymers of acrylamide with said DEMMS monomer are commercially available. For example, an 80:20 acrylamide/DEMMS copolymer. Copolymers of acrylamide with said MTMMS monomer are also commercially available. For example, Hercules Reten 210, a 90:10 acrylamide/MTMMS copolymer; Hercules Reten 220, an 80:20 acrylamide/MTMMS copolymer; Hercules Reten 245, a 55:45 acrylamide/MTMMS copolymer; and Hercules Reten 260, a 40:60 acrylamide/MTMMS copolymer. The type of copolymers wherein the number of units from said formula (C) monomer is within the range of from 10 to 60 mol percent thus comprise another more preferred group of copolymers for use in the practice of the invention. Said copolymers of acryamide with said DEMMS monomer or said MTMMS monomer can be represented by the formula

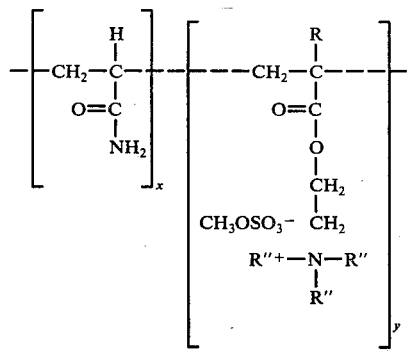
(D)

wherein: R is either hydrogen or a methyl radical; each R'' is a methyl radical, or one R'' is a methyl radical and the other two R'' are each an ethyl radical; and x and y represent the mol percent of said units as set forth above, it being understood that the various copolymers do not necessarily consist of alternating units as depicted above in (D). It is also within the scope of the invention for the acrylamide units in the above formula (D) to be methacrylamide units.

Crosslinked polyacrylamides and crosslinked polymethacrylamides, at various stages of hydrolysis as described above, and meeting the above-stated compatibility requirements, can also be used in the practice of the invention. In general, said crosslinked polyacrylamides can be prepared by the methods described above, but including in the monomeric mixture a suitable amount of a suitable crosslinking agent. Examples of crosslinking agents can include methylenebisacrylamide, divinylbenzene, vinyl ether, divinyl ether, and the like. Said crosslinking agents can be used in small amounts, e.g., up to about 1 percent by weight of the monomeric mixture. Such crosslinking is to be distinguished from any crosslinking which occurs when solutions of polymers and the other components of the gelled acidic compositions of the invention are gelled as described herein.

All the polymers useful in the practice of the invention are characterized by high molecular weight. The molecular weight is not critical so long as the polymer has the above-described water-dispersible properties. It is preferred that the polymer have a molecular weight of at least 500,000, more preferably at least about 2,000,000. The upper limit of molecular weight is unimportant so long as the polymer is water-dispersible, and the gelled acidic composition therefrom can be pumped. Thus, it is within the scope of the invention to use polymers having molecular weights as high as 20,000,000 or higher, and meeting said conditions.

The amount of the above-described polymers used in preparing the gelled acidic compositions of the invention can vary widely depending upon the particular polymer used, the purity of said polymer, and properties desired in said compositions. In general, the amount of polymer used will be a water-thickening amount, i.e., at least an amount which will significantly thicken the water to which it is added. For example, amounts in the order to 25 to 100 parts per million by weight (0.0025 to 0.01 weight percent) have been found to significantly thicken water. Distilled water containing 25 ppm of a polymer of acrylamide having a molecular weight of about $10 \times 10^6$ had a viscosity increase of about 41 percent. At 50 ppm the viscosity increase was about 106 percent. At 100 ppm the viscosity increase was about 347 percent. As another example, distilled water containing 25 ppm of polymer of a acrylamide having a molecular weight of about $3.5 \times 10^6$ had a viscosity increase of about 23 percent. At 50 ppm the viscosity increase was about 82 percent. At 100 ppm the viscosity increase was about 241 percent. Generally speaking, amounts of the above described polymers in the range of from 0.01 to 5, preferably from 0.1 to 1.5, weight percent, based on the total weight of the composition, can be used in preparing gelled acidic compositions for use in the practice of the invention. However, amounts outside said ranges can be used. In general, with the proper amounts of gelation agent, and gelation promoter (when used), the amount of polymer used will determine the consistency of the gel obtained. Small amounts of polymer will usually produce liquid mobile gels which can be readily pumped. Large amounts of polymer will usually produce thicker, more viscous, somewhat elastic gels. Gels having a viscosity "too thick to measure" by conventional methods can still be used in the practice of the invention. Thus, there is really no fixed upper limit on the amount of polymer which can be used so long as the gelled acidic composition can be pumped in accordance with the methods of the invention.

Any suitaable flavotannin (sometimes called the catechol tannins) which is water-dispersible and which will meet the above-stated compatibility requirements can be used in the practice of the invention. Thus, under proper conditions of use, examples of such flavotannins can include: Gambier and Catechu or Burma Cutch; quebracho; Tizerah; Urunday; wattle; mangrove; spruce; hemlock; larch; willow; and Avaram.

Quebracho is the presently most preferred flavotannin for use in the practice of the invention. Quebracho is extracted from the bark and wood of the quebracho tree with water. The conventional method of preparing quebracho is to disintegrate the wood and bark, extract the bark and/or wood with water, the solution of quebracho and water is evaporated to about 85 percent concentration of quebracho, and the concentrated quebracho is spray dried. Quebracho is thus the commercial flavotannin or catechol tannin product. The high tannin content (about 20 percent) of the wood of the quebracho tree makes it the important source of catechol or flavotannins.

The amount of flavotannin used in the practice of the invention will be a small but effective amount which is effective or sufficient to cause gelation of an aqueous dispersion of the starting components of the compositions of the invention. The lower limit on the amount of flavotannin used can vary depending upon several factors incuding the type of polymer used, the concentration of polymer, the type of flavotannin used, and the type of gel product desired. For similar reasons, the upper limit on the amount of flavotannin used cannot always be precisely defined. However, as a general guide, the amount of flavotannin used in preparing the gelled acidic compositions of the invention will usually be in the range of from 0.3 to about 3, preferably 0.4 to about 2 parts by weight per part by weight of polymer used.

Metal compounds which can be used as gelation promoters in the practice of the invention are water-soluble compounds of polyvalent metals which are capable of promoting the gelation of an aqueous dispersion of the starting components of the compositions of the invention, and which will meet the above-stated compatibility requirements. Thus, under proper conditions of use, examples of such compounds can include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds.

The amount of said metal-containing compounds used will be a small amount which is effective or sufficient to promote the gelation of an aqueous dispersion of the starting components of the compositions of the invention. The lower limit of the concentration of the starting metal-containing compound can depend upon several factors including the particular type of polymer used, the concentration of the polymer, the type of flavotannin used, the concentration of the flavotannin, and the type of gel product desired. For similar reasons, the upper limit on the concentration of the starting metal-containing compounds also cannot always be precisely defined. However as a general guide, the amount of the starting polyvalent metal-containing compound used in preparing the gelled acidic compositions of the invention will usually be in the range of from about 0.4 to about 1 part by weight per part by weight of flavotannin gelling agent. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by suitable experiments carried out in the light of this disclosure.

Acids useful in the practice of the invention include any nonoxidizing acid meeting the above-stated compatibility requirements and which is effective in increasing the flow of fluids, e.g., hydrocarbons, through the formation and into the well. Thus, under proper conditions of use, examples of such acids can include inorganic acids such as hydrochloric acid, phosphoric acid, and sulfuric acid; $C_1$—$C_3$ organic acids such as formic acid, acetic acid, propionic acid, and mixtures thereof, and combinations of inorganic and organic acids. The concentration or strength of the acid can vary depending upon the type of acid, the type of formation being treated, the above-stated compatibility requirements, and the results desired in the particular treating operation. The concentration can vary from 1 to about 60 weight percent, with concentrations within the range of 5 to 50 weight percent frequently preferred, based upon the total weight of the gelled acidic composition. When an inorganic acid such as hydrochloric acid is used it is presently preferred to use an amount which is sufficient to provide an amount of HCl within the range of from 3 to 15, more preferably not more than about 10, weight percent, based on the total weight of the gelled acidic composition. The acids used in the practice of the invention can contain any of the known corrosion inhibitors, deemulsifying agents, sequestering agents, surfactants, friction reducers, etc., known in the art, and which meet the above-stated compatibility requirements.

The gelled acidic compositions of the invention are aqueous compositions. They normally contain a significant amount of water. The amount of said water can vary widely depending upon the concentrations of the other components in the compositions, particularly the concentration of the acid. For example, when an organic acid such as acetic acid is used in the maximum concentration of 60 weight percent the amount of water present in the composition clearly will be less than when an inorganic acid such as HCl is used in the preferred maximum concentration of about 10 weight percent. Thus, while no precise overall range of water content can be set forth, based on the above-stated overall ranges for the concentrations of said other components the water content of said compositions can be in the range of from about 5 to about 99, frequently about 80 to about 97, weight percent. However, amounts of water outside said ranges can be used.

Propping agents can be included in the gelled acidic compositions of the invention is desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used they should be made of materials which are not severely attacked by the acid used during the time they are exposed to said acid.

Any suitable method can be employed for preparing the gelled acidic compositions of the invention. Thus, any suitable mixing technique or other of addition of the components of said composition to each other can be employed which will provide a said composition having sufficient stability to degeneration by the heat of the formation (in which the composition is to be used) to permit good penetration of the composition into, and significant etching of, said formation. However, it is ordinarily preferred to first dissolve or disperse the polymer in water before contacting the polymer with acid. Thus, it is preferred to avoid contacting the dry polymer with aqueous acid. Some suitable mixing orders, with the components named in order of mixing, include: water—polymer—flavotannin gelling agent—acid; water—polymer—acid—flavotannin gelling agent; and water—acid—flavotannin gelling agent—acid; and the like. When a gelation promoter, such as sodium dichromate or potassium dichromate, is used, the mixing order can be: water—polymer—flavotannin gelling agent—gelation promoter mixed with the acid; water—polymer—flavotannin gelling agent—acid—gelation promoter; water—polymer—flavotannin gelling agent—gelation promoter—acid; and the like.

The gelled acidic compositions of the invention can be prepared on the surface in a suitable tank equipped with suitable mixing means, and then pumped down the well and into the formation employing conventional equipment for pumping acidic compositions. However, it is within the scope of the invention to prepare said compositions while they are being pumped down the well. This technique is sometimes referred to as "on the fly." For example, a solution of the polymer in water can be prepared in a tank adjacent the well head. Pumping of this solution through a conduit to the well head can then be started. Then, a few feet downstream from the tank a suitable connection can be provided for introducing the flavotannin gelling agent into said conduit, either dry through a mixing hopper, or preferably as an aqueous solution. Then, a few feet farther downstream the acid can be similarly introduced. The gelation promotor, if used, can then be introduced into said conduit a few feet downstream from the acid, or can be introduced with the acid. As will be understood by those skilled in the art, the rate of introduction of said components into said conduit will depend upon the pumping rate of the polymer solution through said conduit. Any of the above-mentioned orders of addition can be employed in said "on the fly" technique. Mixing orifices can be provided in said conduit, if desired.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can by any suitable volume sufficient to significantly decrease the temperature of the formation being treated, and can vary depending upon the characteristics of the formation. For example, amounts up to 20,000 gallons, or more, can be used to obtain a temperature decrease in the order of 100° to 250° F.

The following examples will serve to further illustrate the invention, but should not be considered as unduly limiting on the invention.

EXAMPLE I

A gelled acid composition containing about 9 weight percent hydrochloric acid, about 4000 ppm soluble polymer, and about 3200 ppm quebracho was prepared. The polymer was a commercially available polyacrylamide (Hercules Reten 420) which had a degree of hydrolysis, prior to test, of about 6.3 percent. A 250 ml quantity of a 0.5 weight percent aqueous solution of the polymer was mixed with 1 gram of quebracho. The solution was warmed to 130° F (54° C) and further mixed with 64 ml concentrated (37 weight percent) hydrochloric acid.

A small sample of the acid composition was transferred to a test tube which was then placed in a water bath maintained near its boiling point. A thermometer was placed in the test tube and the effect of the heating on the acid composition was observed. During the heating a significant increase in viscosity was observed at about 200° F and this was considered evidence of gelation.

A similar acid composition was prepared except that the final hydrochloric acid concentration was about 15 weight percent. A 125 ml quantity of a 1 weight Percent aqueous solution of the same polyacrylamide was mixed with 83 ml water and 1 g quebracho. The solution was warmed to 130° F (54° C) and mixed with 108 ml concentrated (37 weight percent) hydrochloric acid. A small quantity of this composition was transferred to a test tube and heated as described above. After several minutes at 210° F (99° C) a good gel was seen to form. The gel persisted for about 5 minutes before undergoing syneresis.

EXAMPLE II

In a manner similar to that of Example I, another gelled acid composition containing about 9 weight percent hydrochloric acid, about 4000 ppm of the same polymer, and about 3200 ppm of quebracho was prepared. A 1 g quantity of quebracho was dissolved in 250 ml of a 0.5 weight percent aqueous solution of the polymer. The solution was warmed to 130° F to facilitate dispersion and then mixed with 64 ml of concentrated hydrochloric acid.

A 15 ml portion of the resulting composition was transferred to a capillary viscometer (Kimax 500) which was then placed in a water bath at about 130° F. The temperature of the water bath was then increased to about 200° F over a period of about 1 hour. At intervals during this period the efflux time of the composition in the viscometer was measured until the composition would not flow through the viscometer. After 40 minutes, and at a bath temperature of 194° F, the composition had thickened to the point that it would not flow and was therefore considered gelled.

Another test was carried out on a similar composition except that both the polymer concentration and the quebracho concentration were increased. A 2 g quantity of quebracho was mixed with 250 ml of a 1 weight percent aqueous solution of the same polyacrylamide at 130° F and then mixed with 64 ml of concentrated hydrochloric acid. The polymer concentration was thus about 8000 ppm, the quebracho concentration was about 6400 ppm, and the acid concentration was about 9 weight percent. A 15 ml quantity of this composition was transferred to the capillary viscometer and tested in a water bath as described above. After 37 minutes, and at a bath temperature of 194° F, the acid composition would not flow through the viscometer and was considered to have gelled.

EXAMPLE III

In a manner essentially identical to that of Example I, another acrylamide homopolymer was used to prepare a gelled hydrochloric acid composition.

A 1 g quantity of quebracho was dissolved in 250 ml of a 0.5 weight percent aqueous solution of a commercial polyacrylamide (American-Cyanamid Cyanamer P-250) having a molecular weight of 5-6 million and a reported degree of hydrolysis of about 5 percent, prior to test. The solution was warmed to 130° F and 64 ml of concentrated hydrochloric acid was added with stirring. As in Example I, a small portion of this composition was transferred to a test tube immersed in boiling water. After 5-10 minutes at about 200° F, the composition becomes highly gelled and thereafter syneresis begins, but rather slowly.

EXAMPLE IV

In a manner essentially identical to that of Example I a copolymer of acrylamide was utilized to prepare a hydrochloric acid composition.

A 0.5 g quantity of quebracho was dispersed in 250 ml of a 0.5 weight percent solution of a copolymer of 90 mol percent acrylamide and 10 mole percent sodium 2-acrylamido-2-methylpropane sulfonate (AMPS monomer). This copolymer (Hercules SPX-5024) was a high molecular weight polymeric material. The solution was warmed to 130° F and 64 ml concentrated hydrochloric acid was added. The composition contained about 9 weight percent acid, about 4000 ppm copolymer, and about 1600 ppm quebracho.

A small portion of this composition was heated in a test tube immersed in boiling water. A good gel was observed to form at about 204° F about 5 minutes after reaching 200° F.

In another run, the same copolymer was used to prepare another gelled acid composition in an identical manner except that the concentration of quebracho was about 3200 ppm. This composition was observed to gel at about 200° F, forming an extremely pituitous gel. Prolonged heating in the boiling water bath caused syneresis of the gel.

In still another run using the same copolymer as above, an identical acid composition was prepared except that the quebracho concentration was about 6400 ppm. This composition was observed to gel about 5 minutes after reaching 200° F.

EXAMPLE V

The same 90 acrylamide: 10 AMPS copolymer of Example IV was again used to prepare a gelled acid composition, similar to that of Example IV. However, the composition was not tested with the test tube-thermometer method of Example IV but was tested with the capillary viscometer method described in Example II.

A 1 g quantity of quebracho was dispersed in 250 ml of a 0.5 weight percent aqueous solution of the above-described copolymer at about 130° F while stirring on a high shear mixer (Hamilton-Beach Malt Mixer). A 64 ml quantity of concentrated hydrochloric acid was added, and a 15 ml portion of the composition was transferred to a capillary viscometer (Kimax 500). The acid composition thus contained about 9 weight percent acid, about 4000 ppm copolymer, and about 3200 ppm quebracho.

After about 37 minutes in the bath, the acid composition exhibited a viscosity increase beginning at about 194° F and extending to about 196.5° F. At about 197° F syneresis was observed to begin.

The same acid composition as above was again prepared by a slightly different procedure. In this run, 125 ml of water containing 1 g quebracho, and 125 ml of a 1 weight percent aqueous solution of the 90 acrylamide:10 AMPS copolymer, were mixed at 130° F. A 64 ml quantity of concentrated hydrochloric acid was then added with stirring. A 15 ml portion was then transferred to the capillary viscometer. A viscosity increase was again observed at 194° F with this composition and syneresis was observed to start at about 195° F.

EXAMPLE VI

The effect of the presence of sodium dichromate of the quebracho-containing gelled acid system was observed in this example.

A 1 g quantity of quebracho was dispersed in 250 ml of a 0.5 weight percent aqueous solution of the acrylamide homopolymer (Hercules Reten 420) described in Example I. The solution was warmed to 130° F and 64 ml concentrated hydrochloric acid was added. A small portion of this solution was subjected to the test tube-thermometer test procedure of Example I and gelation was observed at about 200° F.

The composition and procedure of the above paragraph was repeated except that 5 ml of a 10 weight percent aqueous solution of $Na_2Cr_2O_7.2H_2O$ was added to the concentrated hydrochloric acid before the acid was mixed with the polymer and quebracho solution. With the sodium dichromate present, gelation was observed to take place essentially immediately, at 130° F, and the gel appeared stable for several minutes above 200° F. The acid composition contained about 9 weight percent acid, about 4000 ppm polymer, about 3200 ppm quebracho, and about 1600 ppm dichromate.

EXAMPLE VII

The composition and procedure of the preceding Example VI was again repeated except that the acid composition was subjected to the capillary viscometer test procedure described in Example II.

A 250 ml quantity of a 0.5 weight percent aqueous solution of the polyacrylamide (Hercules Reten 420) was warmed to 130° F and 1 g of quebracho was dispersed therein. The dispersion was cooled to 85° F and 0.5 g sodium dichromate dihydrate in 64 ml concentrated hydrochloric acid was added thereto. The acid composition thus contained about 9 weight percent acid, about 3200 ppm quebracho, about 4000 ppm polymer, and about 1600 ppm dichromate. A portion of the resulting composition was transferred to a capillary viscometer (Kimax 500) which was then placed in a water bath at about 95° F. The temperature of the bath was then increased to about 200° F over a period of about 1 hour. After 5 minutes and with the bath temperature at about 112° F, the efflux time had increased from 35 to 300+. This was considered to be evidence of gelation. After about 10 minutes and with the bath temperature at about 127° F, the composition had gelled. After about 53 minutes, and with the bath temperature at about 200° F, the gel remained a good elastic gel. After about 57 minutes and with the bath still at 200° F, a trace of syneresis was observed.

The procedure of the preceding paragraph was again carried out except that the concentrations of the ingredients of the acid composition were increased. A 1.35 g quantity of quebracho was added to 43 ml water at 130° F and mixed with 135 ml of a 2 weight percent solution of the same acrylamide homopolymer at 130° F. The mixture was cooled to 85° F and combined with 92 ml concentrated hydrochloric acid and then with 0.7 g of sodium dichromate dihydrate. The acid composition thus contained about 15 weight percent acid, about 10,000 ppm polymer, about 5000 ppm quebracho, and about 2500 ppm dichromate. This composition was observed to gel very rapidly in less than 1 minute at about 100° F. A trace of syneresis was observed after about 30 minutes and with the temperature of the water bath at about 180° F. After 51 minutes and with the bath temperature at 197° F about 40 percent syneresis had taken place.

EXAMPLE VIII

In this example still another acrylamide homopolymer was used to prepare a gelled acid composition. The degree of hydrolysis of this homopolymer was substantially higher than that used in earlier examples.

A 0.5 g quantity of quebracho was mixed with 250 ml of a 1 weight percent solution of a polyacrylamide (Dow Pusher 700) having a molecular weight of about 5.5 million and a degree of hydrolysis, prior to test, of 23.5 percent. These ingredients were combined at 130° F and the mixture was cooled to 85° F before adding 64 ml concentrated hydrochloric acid, followed by 0.5 g sodium dichromate dihydrate. The acid composition thus contained about 8000 ppm polymer, about 1600 ppm quebracho, about 1600 ppm dichromate, and about 9 weight percent acid. The acid composition was subjected to the capillary viscometer test of Examples II and VII. After about 2 minutes, and with the bath temperature at about 104° F, the efflux time had increased from 3.0 to 11.6 seconds. The efflux time continued to increase until after about 15 minutes, and with the bath temperature at 143° F, the composition had gelled. After about 38 minutes, and with the bath temperature at about 181° F, the gel was still a good elastic gel. After about 48 minutes, and with the bath temperature at about 190° F, a trace of syneresis was observed. After about 55 minutes, and with the bath temperature at about 195° F, there was about 15 percent syneresis but the gel was still elastic.

A duplicate of the composition and procedure of the preceding paragraph was carried out except that the sodium dichromate dihydrate was dissolved in the hydrochloric acid before mixing with the polymer and quebracho solution. The efflux times showed that the composition underwent a viscosity increase at 3–14 minutes (bath temperature 112°–145° F) but did not completely cease to flow in the viscometer at bath temperatures up to 183° F. A trace of syneresis was observed at 183° F. The results of these two runs indicate that gelation is promoted by an order of addition in which the dichromate is not premixed with the acid but is added separately after the acid.

EXAMPLE IX

The 90 acrylamide:10 AMPS copolymer described in Example IV was used in several runs illustrating the effects of the presence of sodium dichromate dihydrate.

A 1 g quantity of quebracho was mixed into 250 ml of a 0.5 weight percent solution of the copolymer (Hercules SPX-5024) at 130° F, and then mixed with 64 ml. of concentrated hydrochloric acid. A portion of this acid composition was tested by the test tube-thermometer method described in Example I. Gelation was observed to occur at 200° F. After about 10 minutes the gel became pituitous. Prolonged heating in the boiling water bath caused syneresis. The acid composition contained about 9 weight percent acid, about 4000 ppm copolymer and about 3200 ppm quebracho.

The procedure of the preceding paragraph was repeated except that 5 ml of a 10 weight percent solution of sodium dichromate dihydrate was mixed with the acid which was added to the polymer solution. This composition thus contained about 1600 ppm dichromate, about 4000 ppm copolymer, and about 9 weight percent acid. A good gel was observed to occur immediately at 130° F. The gel appeared to be more stable to heating about 200° F than the corresponding gel without the dichromate present.

In still another run, the procedure of the above two paragraphs was repeated except that the 9 weight percent acid composition contained about 4000 ppm polymer, about 6400 ppm quebracho, and about 3200 ppm dichromate. A very good gel was observed to form within seconds at 130° F. about 65 percent syneresis occurred after heating a portion in a test tube for about 30 minutes at above 205° F.

EXAMPLE X

Compositions similar to those of Example IX were again prepared but were tested with the capillary viscometer method described in Example II and VII instead of the test tube-thermometer method of Example I and IX.

A 250 ml quantity of a 0.5 weight percent solution of the 90 acrylamide:10 AMPS copolymer (Hercules SPX-5024) was warmed to 130° F and combined with 1 g quebracho in a high shear mixer. The solution was cooled to 85° F and combined with 64 ml concentrated hydrochloric acid containing 0.5 g sodium dichromate dihydrate dissolved therein. The resulting composition thus contained about 9 weight percent acid, about 4000 ppm copolymer, about 3200 ppm quebracho, and about 1600 ppm dichromate. The efflux times in the viscometer showed that a viscosity increase (evidence of gelation) occurred at 16 to 26 minutes in the bath at a bath temperature of 149° to 169° F. However, the viscosity then decreased (evidence of syneresis) as the bath temperature was increased to 195° F.

In another run, a similar acid composition was prepared except that the dichromate was not premixed with the acid, but was added to the copolymer and quebracho solution as a solid following the acid addition. Thus, 125 ml water containing 1 g quebracho at 130° F was added to 125 ml of a 1 percent solution of the copolymer. The mixture was cooled to 85° F and combined with 64 ml concentrated hydrochloric acid, and then 0.5 g of solid sodium dichromate dihydrate was added thereto. The resulting acid composition was found to gel at 97° F within 2 minutes after the final mixing. After 47 minutes, and at a bath temperature of 196° F, the composition was still a good gel. After 51 minutes, and at a bath temperature of 198° F, a trace of syneresis was observed.

EXAMPLE XI

Several runs were carried out in which a 50 jacrylamide:50 AMPS copolymer was employed to prepare a gelled acid composition using quebracho and sodium dichromate dihydrate.

A 1 g quantity of quebracho was mixed with 250 ml of a 0.5 weight percent solution of the 50:50 copolymer (Hercules SPX-5023). A premixed solution of 64 ml concentrated hydrochloric acid and 10 ml of a 10 weight percent solution of sodium dichromate dihydrate was then combined with said copolymer solution at 130° F. Using the test tube-thermometer method of Example I, the acid composition was observed to gel in a minute or two. After being heated 15 minutes at a temperature of about 200°-210° F, 15 to 20 percent syneresis was observed. The 9 weight percent acid composition contained about 4000 ppm copolymer, about 3200 ppm quebracho, and about 3200 ppm dichromate.

In another run, a similar acid composition was prepared except that the quebracho concentration was doubled to 6400 ppm. A very good gel was observed to form in 10–15 seconds. After 30 minutes in the test tube at a temperature of 200°-210° F, about 10 to 15 percent syneresis was observed.

In still another run an acid composition similar to those in the two preceding paragraphs was prepared except that the 9 weight percent acid composition contained about 4000 ppm copolymer, about 9600 ppm quebracho, and about 3800 ppm dichromate. Gelation was observed at about 130° F after about 10 minutes. Another portion of the composition heated to 205° F was observed to exhibit break-up of the gel after about 5 minutes.

EXAMPLE XII

A cationic acrylamide copolymer was employed in this example in the preparation of a gelled acid composition.

A 125 ml quantity of water at 130° F containing 1 g quebracho was mixed with 125 ml of a 1 weight percent solution of a cationic acrylamide copolymer. The copolymer was a commercially available copolymer prepared from a monomer mixture containing about 80 weight percent acrylamide and about 20 weight percent (acryloyloxyethyl)diethylmethylammonium methyl sulfate, and having a degree of hydrolysis, prior to test, believed to be less than about 10 percent. A 64 quantity of concentrated hydrochloric acid was then added to said quebracho-copolymer solution. A 100 ml aliquot of this acid composition was then combined with 0.2 g sodium dichromate dihydrate and tested in a capillary viscometer as described in Examples II and VII. After 1 minute, and at a bath temperature of about 148° F, the efflux time had increased from 3.0 to 35 seconds. After 10 minutes, and at a bath temperature of about 160° F, the composition gelled. After 47 minutes, and at a bath temperature of about 207° F, syneresis was observed. The 9 weight percent hydrochloric acid composition contained about 4000 ppm copolymer, about 3200 ppm quebracho, and about 2000 ppm dichromate.

The procedure in the above paragraph was essentially repeated except that the concentration of some of the ingredients of the acid composition were increased. Thus, the acid composition in this run contained about 9 weight percent hydrochloric acid, about 6600 ppm copolymer, about 5300 ppm quebracho and about 2650 ppm dichromate. After 2 minutes, and at a bath temperature of about 106° F, the efflux time had increased from 7.4 to 90.0 seconds. After 5 minutes, and at a bath temperature of about 120° F, the composition had gelled. After 30 minutes, and at a bath temperature of about 176° F, there was no evidence of syneresis and the test was terminated.

From a comparison of Examples I – V with Examples VI – XII it is concluded there is a definite advantage in using a gelation promoter, e.g., sodium dichromate, in the gelled acidic compositions of the invention. The data show that the gelation temperature is decreased and the stability of the gels is increased. From Examples VIII and X it is further concluded it is advantageous to incorporate said gelation promoter, e.g., sodium dichromate, into the composition after the acid has been incorporated.

Based on the above data, it is concluded that gelled acidic compositions comprising an aqueous solution of a suitable polymer of acrylamide having incorporated therein a suitable flavotannin, e.g., quebracho, and a suitable acid, e.g., hydrochloric acid, in suitable amounts and in accordance with the above-stated compatibility requirements, are suitable for use in accordance with the invention. From said data, it is further concluded that the components of the gelled acidic compositions of the invention have sufficient compatability with each other to permit good penetration (as defined above) into the formation, and permit maintaining of the composition in contact with the formation for a period of time usually sufficient for the acid to significantly react with the acid-soluble components of the formation. Thus, it is further concluded that suitable compositions in accordance with the invention could be used advantageously for acidizing operations in wells having a depth of up to at least 10,000 feet, and at formation temperatures of up to at least 200° F. The use of a preflush cooling fluid injected down the well and into the formation prior to the injection of the gelled acidic composition would extend said ranges of operation. As will be understood by those skilled in the art, the actual attainable ranges of effective acidizing operation will depend upon the viscosity of the gelled composition, the formation temperature, the composition of the formation, the rate of injection of the gelled acidic composition, the acid concentration in said gelled acidic composition, etc.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method for acid treating a porous subterranean formation susceptible of attack by an acid and penetrated by a well bore, which method comprises:
   injecting into said formation via said well bore a gelled acidic composition comprising
   water;
   a water-thickening amount of a water-dispersible polymer having a molecular weight of at least 500,000 and selected from the group consisting of linear polyacrylamides and polymethacrylamides; partially hydrolyzed linear polyacrylamides and partially hydrolyzed linear polymethacrylamides wherein up to about 25 percent of the carboxamide groups are initially hydrolyzed to carboxyl groups; crosslinked polyacrylamides and crosslinked polymethacrylamides; partially hydrolyzed crosslinked polyacrylamides and partially hydrolyzed crosslinked polyacrylamides wherein up to about 25 percent of the carboxamide groups are initially hydrolyzed to carboxyl groups; linear copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and mixtures thereof;
   an amount of a water-dispersible flavotannin gelling agent which is sufficient to cause gelation of an aqueous dispersion of the components of said composition;
   an amount of a non-oxidizing acid which is sufficient to and capable of reacting with a significant amount of the acid-soluble components of said formation;
   said polymer, said flavotannin gelling agent, and said acid, in the amounts used, being sufficiently compatible with each other in an aqueous dispersion thereof to permit said gelation and thus form a said composition having sufficient stability to degeneration by the heat of said formation to permit good penetation of said composition and in said formation; and
   maintaining said composition in said formation in contact therewith for a period of time usually sufficient for the acid in said composition to react significantly with the acid-soluble components of said formation and stimulate the production of fluids therefrom.

2. A method according to claim 1 wherein:
   the amount of said polymer is within the range of from 0.01 to about 5 weight percent, based on the total weight of said composition;
   the amount of said gelling agent is within the range of from 0.3 to about 3 parts by weight per part by weight of said polymer; and
   the amount of said acid is within the range of from about 1 to about 60 weight percent, based on the total weight of said composition.

3. A method according to claim 1 wherein said polymer is a polyacrylamide having a degree of hydrolysis of not more than about 10 percent.

4. A method according to claim 1 wherein said acid is hydrochloric acid and the amount thereof incorporated in said composition is an amount sufficient to supply not more than about 15 weight percent of HCl.

5. A method according to claim 3 wherein said acid is hydrochloric acid and the amount thereof incorporated into said composition is an amount sufficient to supply not more than about 10 weight percent of HCl.

6. A method according to claim 1 wherein:
   said polymer is a copolymer of acrylamide and sodium 2-acrylamido-2-methylpropane sulfonate wherein the mol ratio of said monomers, in the order named, is about 90:10; and
   said acid is hydrochloric acid and the amount thereof incorporated into said composition is an amount sufficient to supply not more than about 10 weight percent HCl.

7. A method according to claim 1 wherein:
   said polymer is a polyacrylamide having a degree of hydrolysis of not more than about 10 percent, and the amount thereof incorporated into said composition is within the range of from 0.1 to about 1.5 weight percent, based on the total weight of said composition;
   said gelling agent is quebracho, and the amount thereof incorporated into said composition is within the range of from 0.4 to about 2 parts by weight per part by weight of said polymer; and
   said acid is hydrochloric acid, and the amount thereof incorporated into said composition is an amount sufficient to supply not more than about 10 weight percent HCl.

8. A method according to claim 1 wherein:
   said polymer is a copolymer of acrylamide and sodium 2-acrylamido-2-methylpropane sulfonate wherein the mol ratio of said monomers, in the order named, is about 90:10, and the amount of said copolymer incorporated into said composition is within the range of from 0.1 to about 1.5 weight percent, based on the total weight of said composition;
   said gelling agent is quebracho, and the amount thereof incorporated into said composition is within the range of from 0.4 to about 2 parts by weight per part by weight of said polymer; and
   said acid is hydrochloric acid, and the amount thereof incorporated into said composition is an amount sufficient to supply not more than about 10 weight percent HCl.

9. A method for acid treating a porous subterranean formation susceptible of attack by an acid and penetrated by a well bore, which method comprises:

injecting into said formation via said well bore a gelled acidic composition comprising water;

a water-thickening amount of a water-dispersible polymer having a molecular weight of at least 500,000 and selected from the group consisting of linear polyacrylamides and polymethacrylamides; partially hydrolyzed linear polyacrylamides and partially hydrolyzed linear polymethacrylamides wherein up to about 25 percent of the carboxamide groups are initially hydrolized to carboxyl groups; crosslinked polyacrylamides and crosslinked polymethacrylamides; partially hydrolyzed crosslinked polyacrylamides and partially hydrolyzed crosslinked polymethacrylamides wherein up to about 25 percent of the carboxamide groups are initially hydrolyzed to carboxyl groups; linear copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and mixtures thereof;

an amount of a non-oxidizing acid which is sufficient to and capable of reacting with a significant amount of the acid-soluble components of said formation;

a small but effective amount of a water-dispersible flavotannin gelling agent which is sufficient to cause gelation of an aqueous dispersion of the components of said composition;

from about 0.4 to about 1 part by weight of a gelation promoter per part by weight of said gelling agent, said gelation promoter being selected from the group consisting of ammonium chromate, ammonium dichromate, the alkali metal chromates, the alkali metal dichromates, chromium trioxide, sodium permanganate, potassium permanganate, and mixtures thereof;

said polymer, said gelling agent, said gelation promoter, and said acid, in the amounts used, being sufficiently compatible with each other in an aqueous dispersion thereof to permit said gelation and thus form a said composition having sufficient stability to degeneration by the heat of said formation to permit good penetration of said composition into said formation; and maintaining said composition in said formation in contact therewith for a period of time usually sufficient for the acid in said composition to react significantly with the acid-soluble components of said formation and stimulate the production of fluids therefrom.

10. A method according to claim 9 wherein:

the amount of said polymer incorporated into said composition is within the range of from 0.1 to about 1.5 weight percent, based on the total weight of said composition;

the amount of said gelling agent incorporated into said composition is within the range of from about 0.4 to about 2 parts by weight per part by weight of said polymer; and the amount of said acid incorporated into said composition is within the range of from 1 to about 60 weight percent, based on the total weight of said composition.

11. A method according to claim 10 wherein:

said polymer is a partially hydrolyzed polyacrylamide;

said gellling agent is quebracho;

said gelation promoter is sodium dichromate or potassium dichromate; and said acid is hydrochloric acid and the amount thereof is an amount sufficient to supply not more than about 15 weight percent HCl.

12. A method according to claim 11 wherein:

the degree of hydrolysis of said polymer is not more than about 10 weight percent; and the amount of said acid is not more than about 10 weight percent HCl.

13. A method according to claim 10 wherein:

said polymer is a copolymer of acrylamide with a monomer of the formula

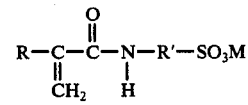

wherein: R is hydrogen or a lower alkyl radical containing from 1 to 6 carbon atoms; R' is an alkylene radical containing from 1 to 24 carbon atoms, or is an arylene radical containing from 6 to 10 carbon atoms; and M is hydrogen, ammonium, or alkali metal; and wherein the number of units from said formula monomer is about 10 mol percent; and said acid is hydrochloric acid and the amount thereof is an amount sufficient to supply not more than about 10 weight percent HCl.

14. A method according to claim 13 wherein:

said polymer is a copolymer of acrylamide with a monomer of the formula

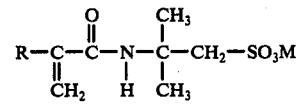

wherein: R is hydrogen or a methyl radical; and M is hydrogen, sodium, or potassium.

15. A method according to claim 14 wherein said copolymer is a copolymer of acrylamide with sodium 2-acrylamido-2-methylpropane sulfonate.

16. A method according to claim 14 wherein said copolymer is a copolymer of acrylamide with 2-acrylamido-2-methylpropane sulfonic acid.

17. A method according to claim 10 wherein:

said polymer is a copolymer of acrylamide with a monomer of the formula

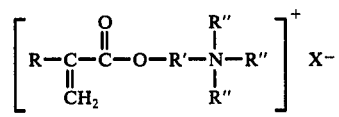

wherein: R is hydrogen or a lower alkyl radical containing from 1 to 6 carbon atoms; R' is an alkylene radical containing from 1 to 24 carbon atoms; or is an arylene radical containing from 6 to 10 carbon atoms; R" is an alkyl radical containing from 1 to 6 carbon atoms; X is any suitable anion selected from the group consisting of methylsulfate, ethylsulfate, chloride, bromide, acetate and nitrate; and wherein the number of units from said formula monomer is within the range of from 1 to 75 mol percent; and said acid is hydrochloric acid and the amount thereof is an amount sufficient to supply not more than about 10 weight percent HCl.

18. A method according to claim 17 wherein:
said polymer is a copolymer of acrylamide with a monomer of the formula

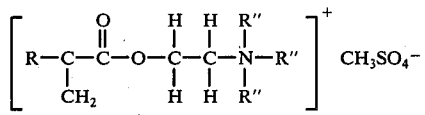

wherein: R is either hydrogen or a methyl radical; and each R" is a methyl radical, or one R" is a methyl radical and the other two R" are each an ethyl radical; and wherein the number of units from said formula monomer is within the range of from 1 to 75 mol percent.

19. A method according to claim 18 wherein said copolymer is a copolymer of acrylamide with (methacryloyloxyethyl)trimethylammonium methyl sulfate.

20. A method according to claim 18 wherein said copolymer is a copolymer of acrylamide with (acryloyloxyethyl)diethylmethylammonium methyl sulfate.

21. A method for acid treating a porous subterranean formation susceptible of attack by an acid and penetrated by a well bore, which method comprises:
injecting into said formation via said well bore a gelled acidic composition comprising
water;
a water-thickening amount of a water-dispersible polymer having a molecular weight of at least 500,000 and selected from the group consisting of linear polyacrylamides and polymethacrylamides; partially hydrolyzed polyacrylamides and partially hydrolyzed linear polymethacrylamides wherein up to about 25 percent of the carboxamide groups are initially hydrolyzed to carboxyl groups; crosslinked polyacrylamides and crosslinked polymethacrylamides; partially hydrolyzed crosslinked polyacrylamides and partially hydrolyzed crosslinked polymethacrylamides wherein up to about 25 percent of the carboxamide groups are initially hydrolyzed to carboxyl groups; linear copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and mixtures thereof, said amount being within the range of from 0.1 to about 1.5 weight percent, based on the total weight of said composition;
an amount of a non-oxidizing acid selected from the group consisting of hydrochloric acid, phosphoric acid, sulfuric acid, formic acid, acetic acid, propionic acid, and mixtures thereof, which is sufficient to and capable of reacting with a significant amount of the acid-soluble components of said formation, said amount being within the range of from about 1 to about 60 weight percent based on the total weight of said composition;
a small but effective amount of a water-dispersible flavotannin gelling agent which is sufficient to cause gelation of an aqueous dispersion of the components of said composition, said amount being within the range of from about 0.4 to about 2 parts by weight per part by weight of said polymer;
said polymer, said flavotannin gelling agent, and said acid, in the amounts used, being sufficiently compatible with each other in an aqueous dispersion thereof to permit said gelation and thus form a said composition having sufficient stability to degeneration by the heat of said formation to permit good penetration of said composition in said formation; and
maintaining said composition in said formation in contact therewith for a period of time usually sufficient for the acid in said composition to react significantly with the acid-soluble components of said formation and stimulate the production of fluids therefrom.

22. A method for acid treating a porous subterranean formation susceptible of attack by an acid and penetrated by a well bore, which method comprises:
injecting into said formation via said well bore a gelled acidic composition comprising
water;
a water-thickening amount of a water-dispersible polymer having a molecular weight of at least 500,000 and selected from the group consisting of linear polyacrylamides and polymethacrylamides; partially hydrolyzed linear polyacrylamides and partially hydrolyzed linear polymethacrylamides wherein up to about 25 percent of the carboxamide groups are initially hydrolyzed to carboxyl groups; crosslinked polyacrylamides and crosslinked polymethacrylamides; partially hydrolyzed crosslinked polyacrylamides and partially hydrolyzed crosslinked polymethacrylamides wherein up to about 25 percent of the carboxamide groups re initially hydrolyzed to carboxyl groups; linear copolymer of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and mixtures thereof, said amount being within the range of from 0.1 to about 1.5 weight percent, based on the total weight of said composition;
an amount of a non-oxidizing acid selected from the group consisting of hydrochloric acid, phosphoric acid, sulfuric acid, formic acid, acetic acid, propionic acid, and mixtures thereof, which is sufficient to and capable of reacting with a significant amount of the acid-soluble components of said formation, said amount being within the range of from about 1 to about 60 weight percent based on the total weight of said composition;
a small but effective amount of a water-dispersible flavotannin gelling agent which is sufficient to cause gelation of an aqueous dispersion of the components of said composition, said amount being within the range of from about 0.4 to about 2 parts by weight per part by weight of said polymer;
a small but effective amount of a gelation promoter which is sufficient to promote said gelation, said gelation promoter being selected from the group consisting of ammonium chromate, ammonium dichromate, the alkali metal chromates, the alkali metal dichromates, chromium trioxide, sodium permanganate, potassium permanganate, and mixtures thereof, said amount being within the range of from about 0.4 to about 1 part by weight per part by weight of said gelling agent;

said polymer, said gelling agent, said gelation promoter, and said acid, in the amounts used, being sufficiently compatible with each other in an aqueous dispersion thereof to permit said gelation and thus form a said composition having sufficient stability to degeneration by the heat of said formation to permit good penetration of said composition into said formation; and maintaining said composition in said formation in contact therewith for a period of time usually sufficient for the acid in said composition to react significantly with the acid-soluble components of said formation and stimulate the production of fluids therefrom.

23. A gelled acidic composition, suitable for matrix acidizing or fracture-acidizing of a porous subterranean formation susceptible of attack by an acid, comprising: water;

a water-thickening amount of water-dispersible polymer having a molecular weight of at least 500,000 and selected from the group consisting of linear polyacrylamides and polymethacrylamides wherein up to about 25 percent of the carboxamide groups are initially hydrolyzed to carboxyl groups; crosslinked polyacrylamides and crosslinked polymethacrylamides wherein up to about 25 percent of the carboxamide groups are initially hydrolyzed to carboxyl groups; linear copolymers of acrylamides or methacrylamide with another ethylenically unsaturated monomer copolymerizable therewith, sufficient acrylamide or methacrylamide being present in the monomer mixture to impart said water-dispersible properties to the resulting copolymer when it is mixed with water; and mixtures thereof;

an amount of a non-oxidizing acid which is capable of reacting with a significant amount of the acid-soluble components of said formation;

a small but effective amount of a water-dispersible flavotannin gelling agent which is sufficient to cause gelation of an aqueous dispersion of the components of said composition; and, from about 0.4 to about 1 part by weight of a gelation promoter per part by weight of said gelling agent, said gelation promoter being selected from the group consisting of ammonium chromate, ammonium dichromate, the alkali metal chromates, the alkali metal dichromates, chromium trioxide, sodium permanganate, potassium permanganate, and mixtures thereof;

said polymer, said gelling agent, said gelation promoter, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to react significantly with the acid-soluble components of said formation and stimulate the production of fluids therefrom.

24. A composition according to claim 23 wherein:
the amount of said polymer incorporated into said composition is within the range of from 0.1 to about 1.5 weight percent, based on the total weight of said composition;

the amount of said gelling agent incorporated into said composition is within the range of from about 0.4 to about 2 parts by weight per part by weight of said polymer; and the amount of said acid incorporated into said composition is within the range of from 1 to about 60 weight percent, based on the total weight of said composition.

25. A composition according to claim 24 wherein:
said polymer is a partially hydrolyzed polyacrylamide;
said gelling agent is quebracho;
said gelation promoter is sodium dichromate or potassium dichromate; and
said acid is hydrochloric acid and the amount thereof is an amount sufficient to supply not more than about 15 weight percent HCl.

26. A composition according to claim 25 wherein the amount of said acid is an amount sufficient to supply not more than about 10 weight percent HCl.

27. A composition according to claim 24 wherein:
said polymer is a copolymer of acrylamide with a monomer of the formula

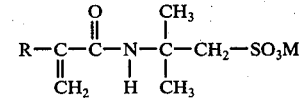

wherein: R is hydrogen or a lower alkyl radical containing from 1 to 6 carbon atoms; R' is an alkylene radical containing from 1 to 24 carbon atoms, or is an arylene radical containing from 6 to 10 carbon atoms; and M is hydrogen, ammonium, or alkali metal; and wherein the number of units from said formula monomer is within the range of from 5 to 60 mol percent; and said acid is hydrochloric acid and the amount thereof is an amount sufficient to supply not more than about 10 weight percent HCl.

28. A composition according to claim 27 wherein:
said polymer is a copolymer of acrylamide with a monomer of the formula

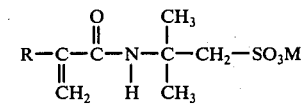

wherein R is hydrogen or a methyl radical; and M is hydrogen, sodium, or potassium.

29. A composition according to claim 28 wherein said copolymer is a copolymer of acrylamide with sodium 2-acrylamido-2-methylpropane sulfonate.

30. A composition according to claim 26 wherein said copolymer is a copolymer of acrylamide with 2-acrylamido-2-methylpropane sulfonic acid.

31. A composition according to claim 24 wherein:
said polymer is a copolymer of acrylamide with a monomer of the formula

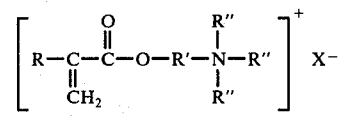

wherein: R is hydrogen or a lower alkyl radical containing from 1 to 6 carbon atoms; R' is an alkylene radical containing from 1 to 24 carbon atoms; or is an arylene radical containing from 6 to 10 carbon atoms; R'' is an alkyl radical containing from 1 to 6 carbon atoms; X is any suitable anion selected from the group consisting of methylsulfate, ethylsulfate, chloride, bromide, acetate and nitrate; and wherein the number of units from said formula monomer is within the range of from 1 to 75 mol percent; and said acid is hydrochloric acid and the amount thereof is an amount sufficient to supply not more than about 10 weight percent HCl.

32. A composition according to claim 31 wherein:

said polymer is a copolymer of acrylamide with a monomer of the formula

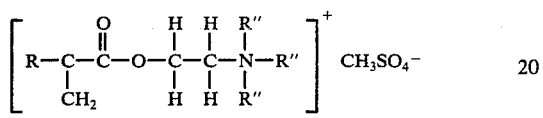

wherein: R is either hydrogen or a methyl radical; and each R'' is a methyl radical, or one R'' is a methyl radical and the other two R'' are each an ethyl radical; and wherein the number of units from said formula monomer is within the range of from 1 to 75 mol percent.

33. A composition according to claim 32 wherein said copolymer is a copolymer of acrylamide with (methacryloyloxyethyl)trimethylammonium methyl sulfate.

34. A composition according to claim 32 wherein said copolymer is a copolymer of acrylamide with (acryloyloxyethyl)diethylmethylammonium methyl sulfate.

35. A gelled acidic composition, suitable for matrix acidizing or fracture-acidizing of a porous subterranean formation susceptible of attack by an acid, comprising: water;

a water-thickening amount of a water-dispersible polymer having a molecular weight of at least 500,000 and selected from the group consisting of linear polyacrylamides and polymethacrylamides; partially hydrolyzed linear polyacrylamides and partially hydrolyzed linear polymethacrylamides wherein up to about 25 percent of the carboxamide groups are initially hydrolyzed to carboxyl groups; crosslinked polyacrylamides and crosslinked polymethacrylamides; partially hydrolyzed crosslinked polyacrylamides and partially hydrolyzed crosslinked polymethacrylamides wherein up to about 25 percent of the carboxamide groups are initially hydrolyzed to carboxyl groups; linear copolymers of acrylamide or methacrylamide with another ethylenically unsaturated monomer copolymerizable therewith, sufficient acrylamide or methacrylamide being present in the monomer mixture to impart said water-dispersible properties to the resulting copolymer when it is mixed with water, and mixtures thereof, said amount being within the range of from 0.1 to about 1.5 weight percent, based on the total weight of said composition;

an amount of non-oxidizing acid selected from the group consisting of hydrochloric acid, phosphoric acid, sulfuric acid, formic acid, acetic acid, propionic acid, and mixtures thereof, which is sufficient to and capable of reacting with a significant amount of the acid-soluble components of said formation, said amount being within the range of from about 1 to about 60 weight percent based on the total weight of said composition;

a small but effective amount of a water-dispersible flavotannin gelling agent which is sufficient to cause gelation of an aqueous dispersion of the components of said composition, said amount being within the range of from about 0.4 to about 2 parts by weight per part by weight of said polymer;

a small but effective amount of a gelation promoter which is sufficient to promote said gelation, said gelation promoter being selected from the group consisting of ammonium chromate, ammonium dichromate, the alkali metal chromates, the alkali metal dichromates, chromium trioxide, sodium permanganate, potassium permanganate, and mixtures thereof, said amount being within the range of from about 0.4 to about 1 part by weight per part by weight of said gelling agent;

said polymer, said gelling agent, said gelation promoter, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time usually sufficient for the acid in said composition to react significantly with the acid-soluble components of said formation and stimulate the production of fluids therefrom.

36. A method for preparing a gelled acidic composition, suitable for matrix acidizing or fracture-acidizing of a porous subterranean formation susceptible of attack by an acid, said method comprising:

a. dispersing in water a water-thickening amount of a water-dispersible polymer having a molecular weight of at least 500,000 and selected from the group consisting of linear polyacrylamides and polymethacrylamides wherein up to about 25 percent of the carboxamide groups are initially hydrolyzed to carboxyl groups; crosslinked polyacrylamides and crosslinked polymethacrylamides wherein up to about 25 percent of the carboxamide groups can be initially hydrolyzed to carboxyl groups; linear copolymers of acrylamides or methacrylamide with another ethylenically unsaturated monomer copolymerizable therewith, sufficient acrylamide or methacrylamide being present in the monomer mixture to impart said water-dispersible properties to the resulting copolymer when it is mixed with water; and mixtures thereof;

b. then dispersing in said polymer-containing water a small but effective amount of a water-dispersible flavotannin gelling agent which is sufficient to cause gelation of an aqueous dispersion of the components of said composition;

c. then adding to said water an amount of an acid which is capable of reacting with a significant amount of the acid-soluble soluble components of said formation, and from about 0.4 to about 1 part by weight of a gelation promoter per part by weight of said gelling agent, said gelation promoter being selected from the group consisting of ammonium chromate, ammonium dichromate, the alkali metal chromates, the alkali metal dichromates, chromium trioxide, sodium permanganate, potassium permanganate, and mixtures thereof;

said polymer, said gelling agent, said gelation promoter, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time usually sufficient for the acid in said composition to react significantly with the acid-soluble components of said formation and stimulate the production of fluids therefrom.

37. A method according to claim 36 wherein:

the amount of said polymer is within the range of from 0.1 to about 1.5 weight percent, based on the total weight of said composition;

the amount of said gelling agent is within the range of from about 0.4 to about 2 parts by weight per part by weight of said polymer; and the amount of said acid is within the range of from 1 to about 60 weight percent, based on the total weight of said composition, said acid is selected from the group consisting of hydrochloric acid, phosphoric acid, sulfuric acid, formic acid, acetic acid, propionic acid, and mixtures thereof.

38. A method according to claim 37 wherein in step (c) said gelation promoter is dissolved in said acid and is added to said water along with said acid.

39. A method according to claim 37 wherein, in step (c), said gelation promoter is added to said water after said acid has been added to said water.

* * * * *

UNITED STATES PATENT AND TRADEMARK OFFICE
CERTIFICATE OF CORRECTION

PATENT NO. : 4,055,502
DATED : October 25, 1977
INVENTOR(S) : Billy L. Swanson

It is certified that error appears in the above-identified patent and that said Letters Patent are hereby corrected as shown below:

Column 19, line 41, change "polyacrylamides" to ---polymethacrylamides---;

line 64, delete "and".

Column 24, line 36, change "re" to ---are---.

Column 26, lines 27-30, change the formula to read

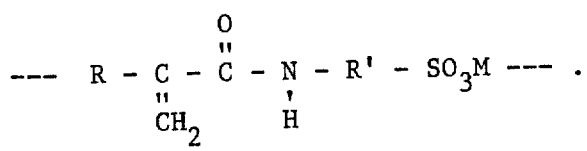

Column 28, line 46, delete "can be" and substituted---are---;

line 61, delete "soluble", second occurrence.

Signed and Sealed this

Second Day of May 1978

[SEAL]

Attest:

RUTH C. MASON
Attesting Officer

LUTRELLE F. PARKER
Acting Commissioner of Patents and Trademarks